(12) United States Patent
Marking

(10) Patent No.: US 7,165,050 B2
(45) Date of Patent: Jan. 16, 2007

(54) MEDIA ON DEMAND VIA PEERING

(76) Inventor: Aaron Marking, 10555 SW. 63rd Dr., Portland, OR (US) 97219

(*) Notice: Subject to any disclaimer, the term of this patent is extended or adjusted under 35 U.S.C. 154(b) by 55 days.

(21) Appl. No.: 11/171,657

(22) Filed: Aug. 8, 2005

(65) Prior Publication Data
US 2006/0064383 A1    Mar. 23, 2006

(51) Int. Cl.
| | |
|---|---|
| G06Q 99/00 | (2006.01) |
| H04K 1/00 | (2006.01) |
| H04L 9/00 | (2006.01) |
| H04N 7/173 | (2006.01) |
| G11B 7/085 | (2006.01) |
| G11B 21/08 | (2006.01) |

(52) U.S. Cl. .................... 705/51; 705/71; 725/87; 725/89; 369/30.8

(58) Field of Classification Search .............. 705/51, 705/71; 725/87, 89; 369/30.8
See application file for complete search history.

(56) References Cited

U.S. PATENT DOCUMENTS

| | | | |
|---|---|---|---|
| 5,870,543 A * | 2/1999 | Ronning ................ | 726/33 |
| 6,701,528 B1 * | 3/2004 | Arsenault et al. ........ | 725/89 |
| 2003/0145093 A1 * | 7/2003 | Oren et al. ............. | 709/229 |
| 2004/0091114 A1 * | 5/2004 | Carter et al. ........... | 380/259 |

OTHER PUBLICATIONS

Wayne Chang, "Peer-to-Peer Communication & Entertainment for Mobile PCs", Jun. 1, 2005, VTF 2005 VIA Technology Forum, all pages (http://www.via.com.tw/en/downloads/presentations/events/vtf2005/vtf05_mp_acegain.pdf).*

Hilt, Mauve, Vogel, Effelsberg, "Interactive Media on Demand: Generic Recording and Replay of Interactive Media Streams", 2001, University of Mannheim, Germany, pp. 593-594 ().*

Dawn C. Chmielewski, "File-swapping embraced", Nov. 24, 2004, The Mercury News, 2 pages (http://www.wurldmedia.com/news_mercurynews112404.pdf).*

John Borland, "P2P start-up gets record label deals", Nov. 24, 2004, CNET News.com, 1 page (http://www.wurldmedia.com/cnet112404.html).*

* cited by examiner

Primary Examiner—Andrew J. Fischer
Assistant Examiner—Nancy Le
(74) Attorney, Agent, or Firm—Marger Johnson & McCollom, P.C.

(57) ABSTRACT

A method of protecting media files includes dividing a media file into segments. Each segment is encrypted multiple times with a different encryption key each time. Downloads of the segments are controlled such that different combinations of segments and keys are downloaded. Key bundles are provided to user devices, with each key bundle is a combination of keys only for that user device combination of segments and keys.

7 Claims, 9 Drawing Sheets

MEDIA ON DEMAND VIA PEERING

This application claims priority from U.S. patent application Ser. No. 10/945,623 "MEDIA ON DEMAND VIA PEERING" filed Sep. 20, 2004.

BACKGROUND

Delivery of media, such as video, music, and pictures, across networks can raise many issues. For example, sharing of digital files, such as music files, led to the situation that arose with Napster™. Owners of the content objected to having their properties being freely distributed with no payments being made to the owners.

Video on demand, such as through cable and satellite providers, may result in issues at the distribution, or head, end. The head end hardware must be extremely robust and the connectivity must be very high, as the content is delivered from one central location. This results in high start up costs, and continued operational costs.

Other types of media distribution, such as rentals, present their own issues. Rental stores must track the outstanding rentals and charge fees for overdue rentals. This decreases consumer satisfaction. Other media distributors, such as NetFlix, may suffer from high costs due to low consumer turnover of the media. Every copy of a movie owned by NetFlix has a cost associated with it. As the users are flat fee users, when a user holds on to one copy of a title for a long time, the profit made from that copy decreases.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
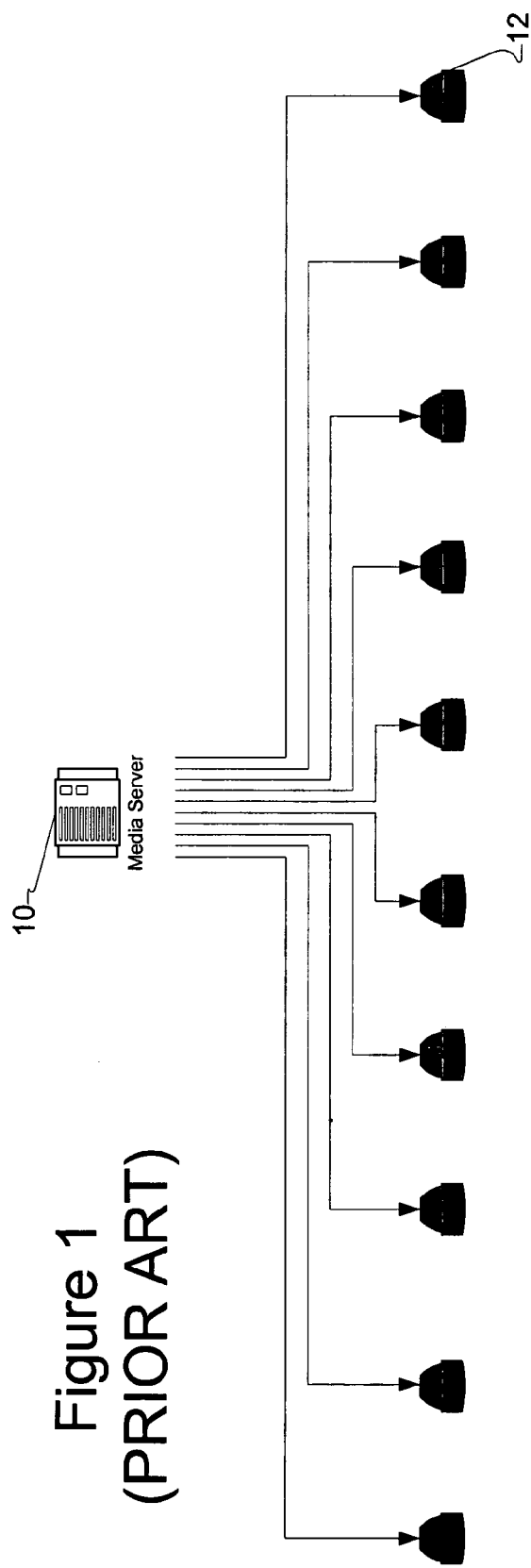
FIG. 1 shows a prior art embodiment of a client/server network.
Figure 2:
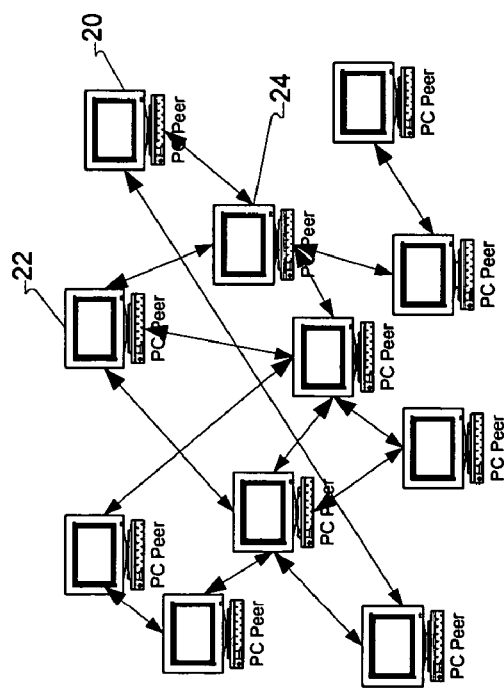
FIG. 2 shows a prior art embodiment of a peering network.

FIG. 1 shows a traditional client/server type of media-on-demand network. A central server 10, which may be a regional server or local hub as well, delivers the content to the requesting user such as 12. The distribution hardware must be very robust so as to not fail in the middle of media content delivery, and the connection between the requesting user device and the central server must remain stable. The distribution hardware must also be able to support multiple concurrent users. In order to ensure this reliability, the components are generally expensive. This results in high startup costs, scaling costs to expand the network, and high, continuing operational costs.

As an alternative, a peering network uses each user device as a miniature server. The term 'server' as used here does not necessarily mean a separate, dedicated device as is implied by the prior art. A server could be one device upon which multiple functions are running, and so will be referred to here as a module. A media module and a license module may both be processes running on the same device, although they may be referred to separately here, for ease of discussion. Each miniature module such as 20, 22 and 24, shares storage and bandwidth resources. This mitigates the head end bandwidth and scaling problems.

As seen by examples such as Napster™ and Kazaa™, the ability to abuse the rights of the content owners is also enabled. Media license owners have come to view these types of networks with suspicion. Indeed, the very distributed nature of peering PC-based networks that allows the fast delivery of content also may make it vulnerable to hacking. There is no centralized server to authenticate users and validate the media being exchanged. Piracy becomes commonplace and the quality of the media varies greatly.

Figure 3:
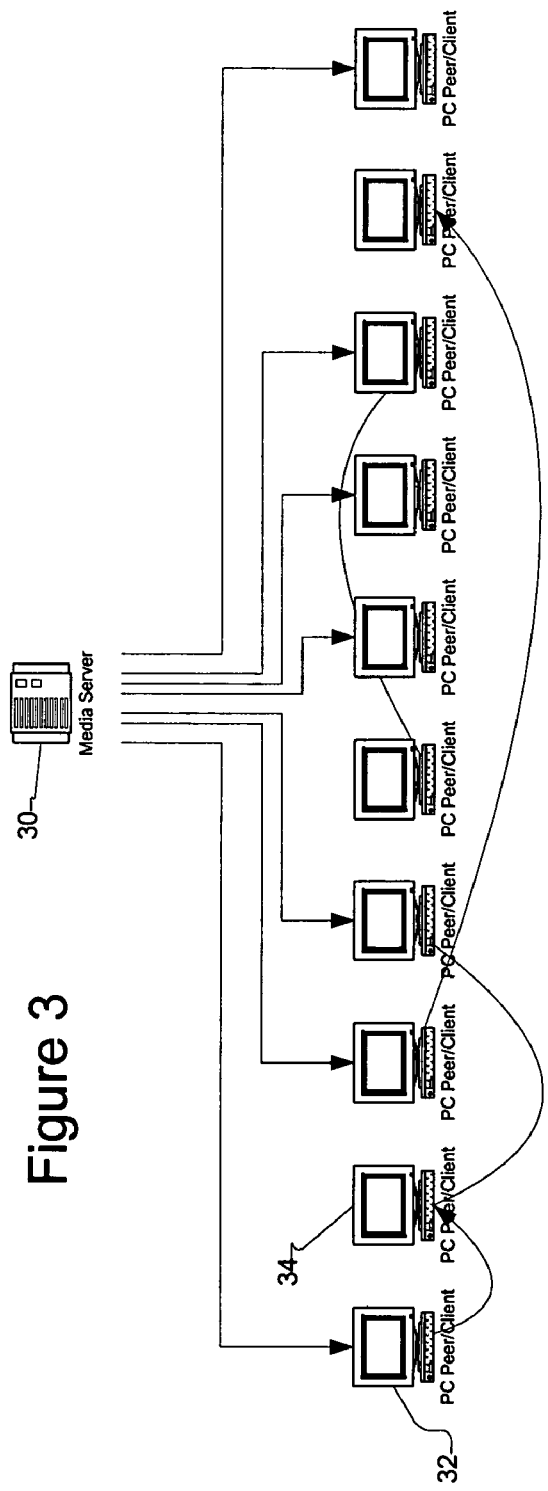
FIG. 3 shows an embodiment of a non-autonomous peer network.

FIG. 3 shows an example of a non-autonomous network. Non-autonomous, as used here, indicates a network that cannot function in the manner of a true peer-to-peer network. Participation in the network as a peer server, as well as access to the content available from peers and centralized storage, is done through a centralized authentication process. However, once a user device is validated, it can become a peer server. In addition, each transaction can be validated to further ensure that only verified devices can receive downloads.

While transactions are centrally validated and initiated, it must be understood that there is also a large measure of anonymity. No user knows from where the content is coming, or to where it is being sent. Users will only know that they are receiving verified downloads and possibly sending content to other users.

For example, once device 32 requests a download of content, and the device has been validated by the media module 30, the content is downloaded to 32. Further on in the operation of the network, if device 34 requests a download and is verified, device 34 may receive the download from peer 32, at least in part. As the device 32 may be local to device 34, the peer download may occur more quickly than the download from the media module 30. As will be discussed in more detail further, there may be several peers similar to 32 that are transmitting data to peer 34.

The devices of FIG. 3 are shown as being personal computers. In an alternative embodiment, shown in FIG. 4, the peer devices 42 and 44 could be television set top boxes. The set top boxes (STBs) may also include digital video recorders (DVRs), such as TiVO®, or RePlayTV™ boxes. A network already connects these devices, which may be the Internet. Each device has its own network address, more than likely an Internet Protocol (IP) address and a connection to the Internet. This network also already has some centralized control, by the subscription management system within the media module system 40. In addition, the devices could be one of many media devices, such as music players, video games, etc.

As mentioned previously one embodiment of the invention uses 'shotgun' downloading, where each media file desired by a user is divided into predefined segments, such as by time, and the segments are received from several different peers. In this manner, the bandwidth needed to download content in such a system is vastly reduced when compared to a traditional client/server download. For example, consider 10 users each desiring the same 10 Megabyte (MEG) download. This results in a requirement of 100 MEGs of bandwidth. Add on top of that an overhead value for transactional instructions. For ease of discussion, 100 kilobytes (100 K) will be assumed. The overall requirement is 2*100K*10, which equals 2 MEG, plus the 100 MEGs of data to be downloaded. The bandwidth necessary is therefore 102 MEG. The need for concurrent download capability such that each user is requesting their data at the same time places a large bandwidth load on the system.

Figure 5:
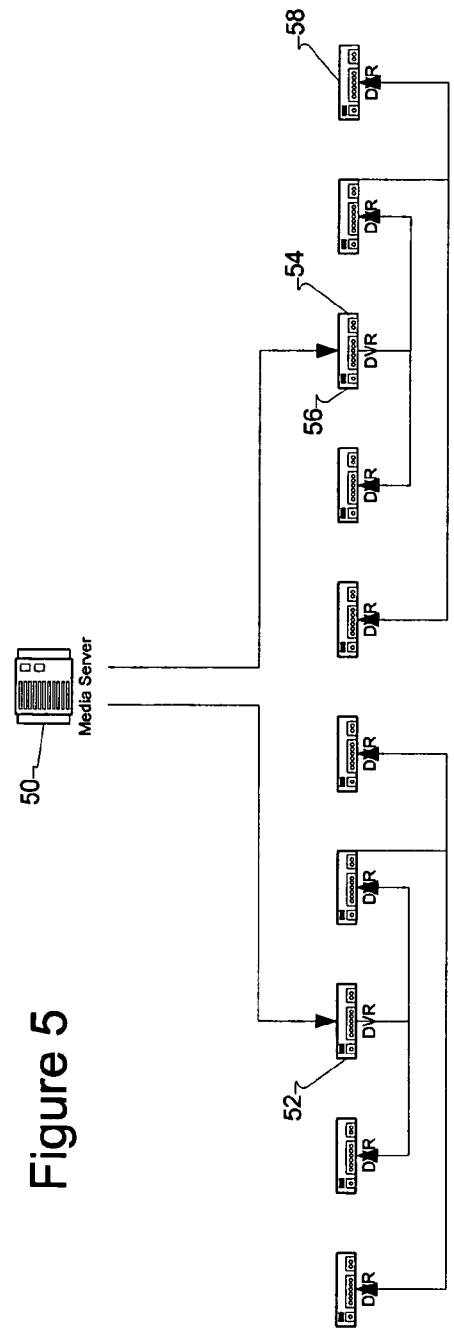
FIG. 5 shows a method of propagating data throughout a peer network.

In contrast, a shotgun download from peers that have previously received the file reduces the amount of bandwidth required. As can be seen in FIG. 5, the first two peers to receive the file, 52 and 54, then act as servers to transmit it to other peers when requested, such as peers 56 and 58. The same file can be downloaded 10 times but only require 20 MEGs of download bandwidth, plus 3*100K*10, for transactional instructions. The same download therefore only requires 23 Megs of bandwidth. The ability to serve several different users concurrently with relatively low bandwidth is a large advantage of this approach.

Figure 4:
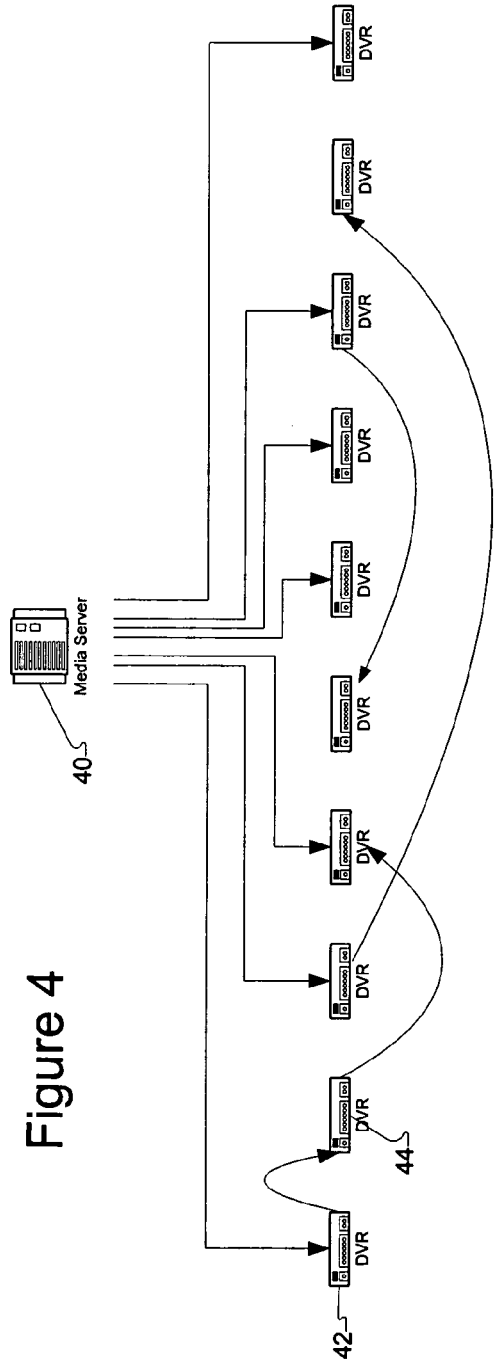
FIG. 4 shows an alternative embodiment of a non-autonomous peer network.
Figure 6:
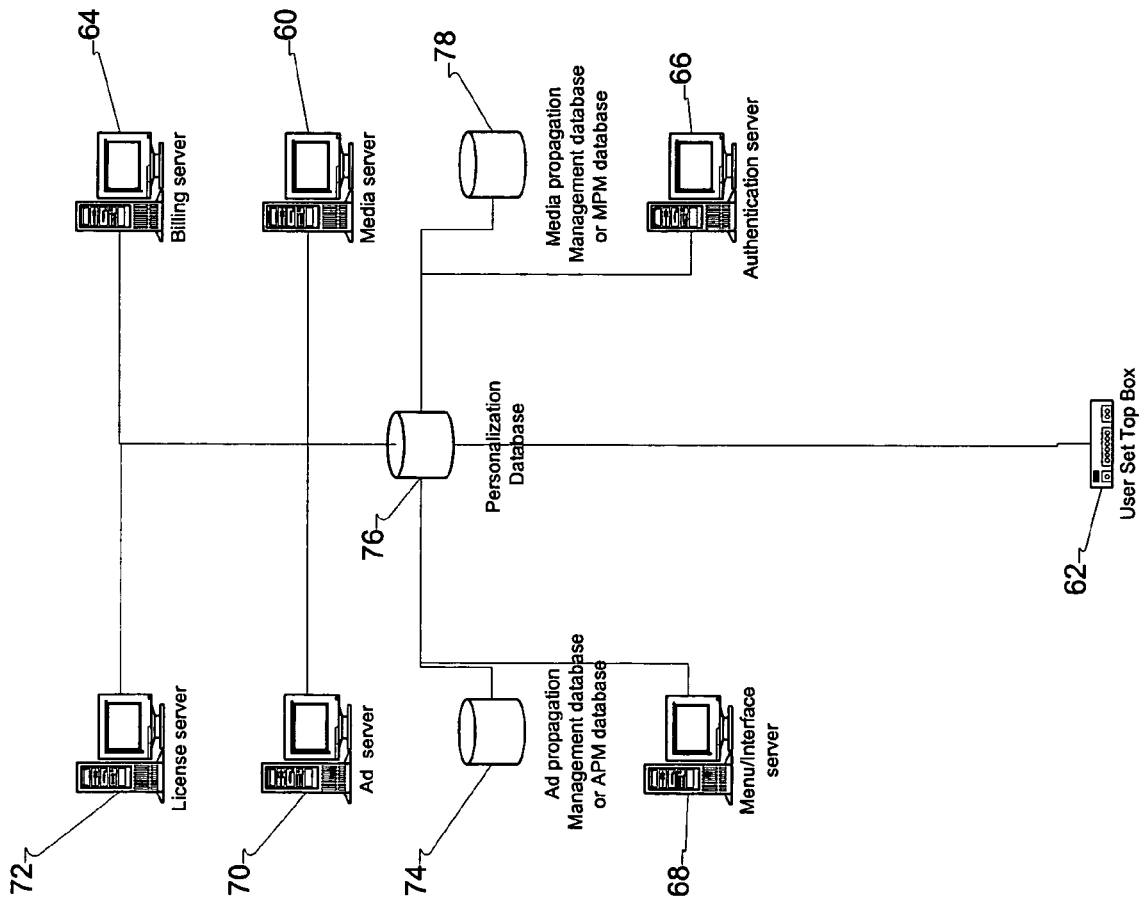
FIG. 6 shows an embodiment of a non-autonomous peer network having multiple components.

The network diagrams of FIGS. 4 and 5 are simplified for ease of discussion. The network may have several different types of modules and databases distributed throughout it. Examples of other possible components of the network are shown in FIG. 6. As discussed previously, the user of the term 'server' does not necessarily imply a device running server software. The server may be process running in parallel or series with other processes on the same device, as well as a logical layer in a database. Essentially, a server here is a functionality provided in whatever means the system designer desires and is used interchangeably with module.

Generally, the network has a media module 60 and a network of user media devices, such as set top box 62. The set top box would have storage for storing media content, a processor, a communications port to allow the processor to interact with the network, which may include exchange of data with other boxes on the network, and a media port to allow the processor to deliver the media content, such as a speaker port or a display port. The media module would then be operable to authenticate each device to allow it to receive content and control download of media to a requesting one of the devices, such as 62, wherein control includes an ability to direct other devices to transfer media content to the requesting device.

A license module 72 may exist in the network. It may maintain a database of decryption keys allowing the devices to decode the content delivered in encrypted form. The license module may track title usage in real-time to ensure that each license for each title stays within its limits. For example, there may be five available licenses for a particular title, and the license module would ensure that only five versions of the file were in use at any given time. It may also track the payouts to license holders.

A billing module 64 may administer user accounts, track usage and ensure users are billed for their usage of the titles. The billing module may also allow electronic payment, etc., for the user accounts. The billing module may also take information from the license module and ensure that license holders are appropriately paid.

An advertisement module 70 works in conjunction with an advertisement propagation management database to propagate advertisements and other paid media files such as sponsored events and movies to the user devices. The advertisement module may also be referred to as an advertisement propagation management module. Similarly, the media module 60 may be referred to as a media propagation management module operating in conjunction with the media propagation management database 78.

The databases generally track locations, such as of the advertisement media or the content media, across the peered devices of the network. As mentioned above, the various modules may be layers within the databases.

The media module maintains encrypted copies of all of the titles. Early in a title life cycle, when not many devices have downloaded it, the media module will provide the copies of the media files as needed. Later in the life cycle, when enough copies have been propagated among the peers to allow peer downloads, the media module may maintain an archival copy.

There may also be a menu/interface module 68, which produces the user interfaces provided at the user device to allow the user to navigate the available content. This may also allow other services, such as e-mail, account management, etc. The menu/interface module may receive personalization of the menus and selections from a personalization database 76.

The personalization database 76 maintains a database record of user interface personalization data, selected preferences and usage history information. It may also allow multiple user profiles per customer account, such as for multiple users in a household. The user profiles may also allow parental controls, demographic targeting for advertisers and other tailored services. The personalization database may also provide information for billing, such as credit card selections, advertisement information for the advertisement module, etc.

Figure 7:
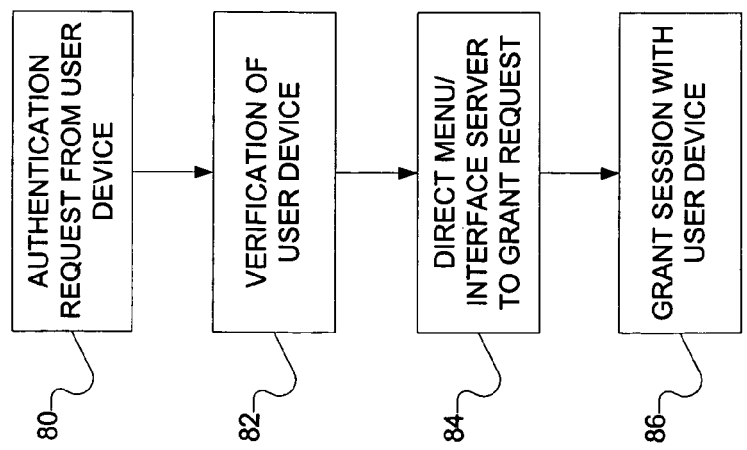
FIG. 7 shows an embodiment of a method to authenticate a user in a non-autonomous peer network.

The elements of the network may provide a peering network with all of its advantages, but there must also be some sort of protection in place for the rights holders. An authentication module 66 stores client account data and ensures that only authenticated devices are available as peers for other devices as well as for downloads from the media module. One of the first processes that will take place upon a user query for a title delivery is user authentication. An embodiment of this process is shown in flowchart form in FIG. 7, which may be better understood in conjunction with FIG. 6.

At 80, the authentication module receives a request from a user device, such as a set top box. At 82 the user device is verified. Verification may take many forms, but as the user device is a dedicated piece of hardware, a hardware solution may be most desirable, such as a hardware key, a smart card or a SIM card resident in the device.

At 84, the authentication module directs the menu/interface module to grant the user request and the menu/interface module initiates a secure session with the user device at 86. Generally, this process will take place for all transactions, as will be discussed in more detail further.

Figure 8:
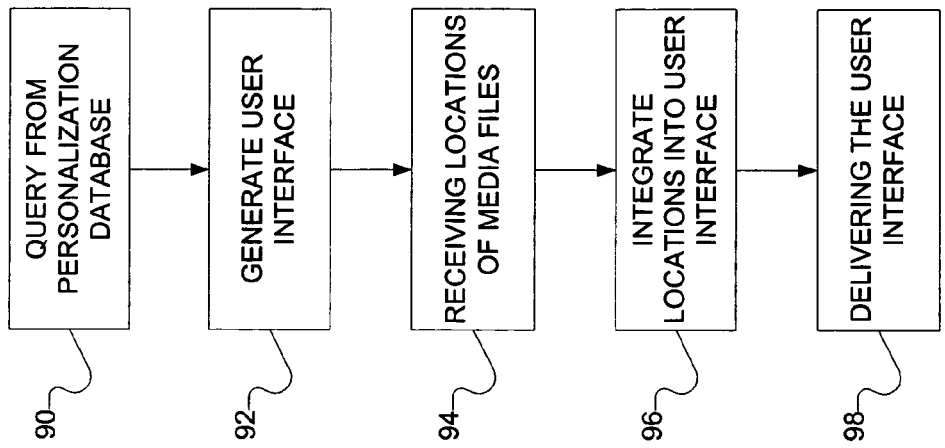
FIG. 8 shows an embodiment of a method to personalize a user interface in a non-autonomous peer network.

In FIG. 8, an embodiment of a method of providing a personalized interface to a user is shown in flowchart form. At 90, the menu/interface module receives a request from the personalization database. The user interface is generated and populated with information derived from the personalization database at 92. Media files related to the user preferences, etc., are located at 94 from the media propagation management module and the advertisement propagation management module in response to a request from the menu/interface module. These locations are then integrated into the user interface at 96 and delivered to the user at 98. The integration of the locations may be performed by the propagation management modules, either advertisement or media modules, both advertisement and media modules, or by the menu/interface module. These functions may be distributed throughout various physical devices, databases, and application, and any combinations thereof.

Figure 9:
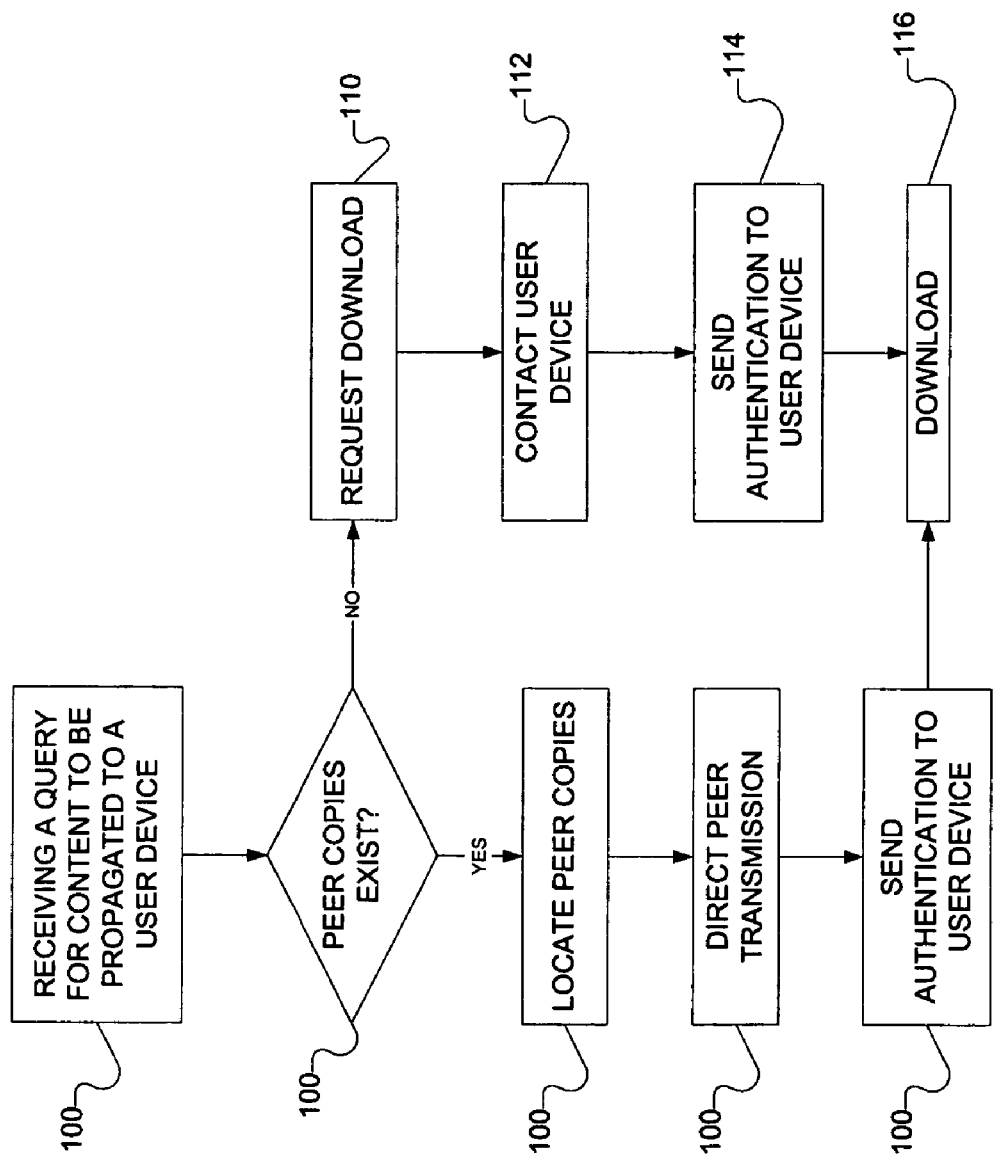
FIG. 9 shows an embodiment of a method to perform personalization content delivery.

The personalization information for each user provides pinpoint demographic information. This may allow for a much higher level of content tailoring, both for media and advertising. This could be accomplished in the off hours, balancing the load on the network. An example of such a process is shown in flowchart form in FIG. 9.

At 100, the personalization database may query the propagation management modules to request content to be propagated to a user device. At 102, the propagation management modules determine if peer copies exist. If peer copies exist, the peer copies are located and peer transmission is directed and monitored by the propagation management modules at 106. In the meantime, authentication is sent to the user device at 108, to ensure that the user device will allow the peers access.

If no peer copies of the desired content exist at 102, a download from the appropriate media or advertisement propagation module is requested at 110. The user device is contacted at 112, and authentication sent at 114. In either case, the download, either from peers or the media module, occurs at 116. Once the data is downloaded, the user device may cache a local copy to have it available for other peers as needed.

Figure 10:
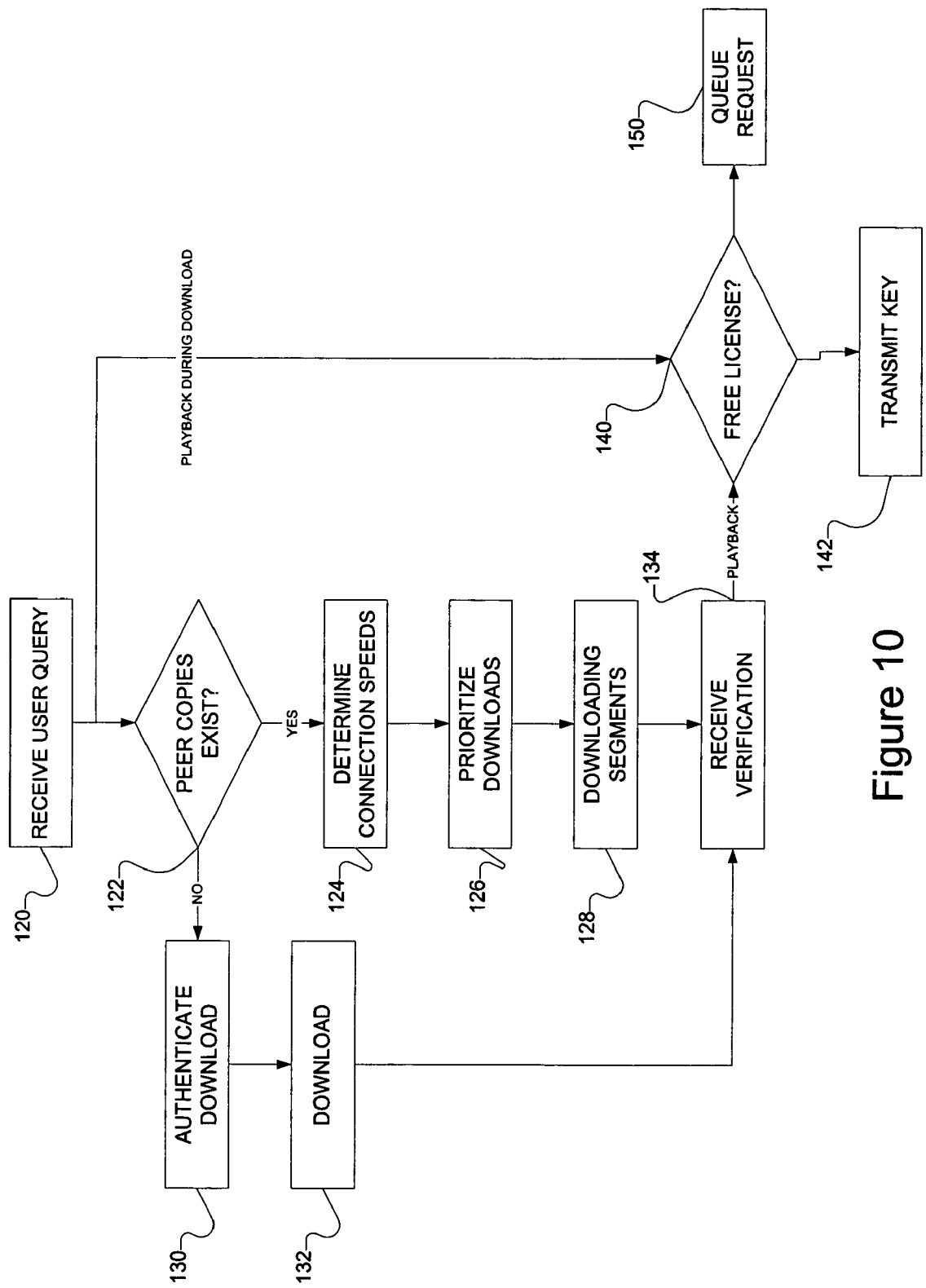
FIG. 10 shows an embodiment of a method to deliver licensed content to a user in a non-autonomous peer network.

Downloading media content, as opposed to advertising content that is assumed to be license free as its download is for the benefit of the license owners, may require a license verification. During a media download, shown in flowchart form in FIG. 10, no license may be required, until the user requests playback.

At 120, a user query for requested content is received. At that point, two processes occur. First, the existence of any peer copies that can be used for downloading is determined at 122 and the existence of an available license is determined at 140. Note that the term 'free license' does not imply free from costs, just that there is a license available to be put to use. If a license exists, a key is transmitted at 142 that allows the user device to decode the content when it is received, however it is received. If there is no license currently free to be given to the user device, the user request may be queued at 150 while the system waits for a license to become available, or other options may be presented to the user. Generally, the system will strive to ensure that enough licenses are available for multiple concurrent users. This may involve generation of licenses 'on-the-fly' by the license module, with the appropriate tracking for billing and accountability.

The license key may only be needed upon playback. It is possible, in this system, for the user device to begin playback during the download process. The playback device merely determines that it has enough content to begin playback that it will not 'run out' of content before more is downloaded. In this instance, the license transaction will occur for playback during download.

Alternatively, the license may not be required at a later time, when the user attempts playback. This is shown by the 'playback' path in FIG. 10. The user may store the content on the device for any period of time the user desires. The user device may be sending the content to other devices during this time. The license is only required when the content is to be played back.

Returning to the download process, the content may be downloaded from the media module if it is an initial download. If no peer copy exists at 122, the download is authenticated to the user device at 130 and the file downloaded at 132. Once the file is downloaded, the user device verifies it to the media propagation management module so the module is aware that the user device may become an available peer for future downloads.

If peer copies exist, the media propagation management module may then determine connection speeds between the various peers and the user device at 124. The segments of the file to be downloaded may then be prioritized to allow the highest priority segments to be downloaded across the fastest connection at 126. The segments are then downloaded at 128. The user device then verifies the download at 134. During the downloading process, the user device may perform an analysis of the properties of the downloaded data, such as the compression rate and download rate, to determine when the user can begin experiencing the content while the remaining portions of it are still be downloaded.

Figure 11:
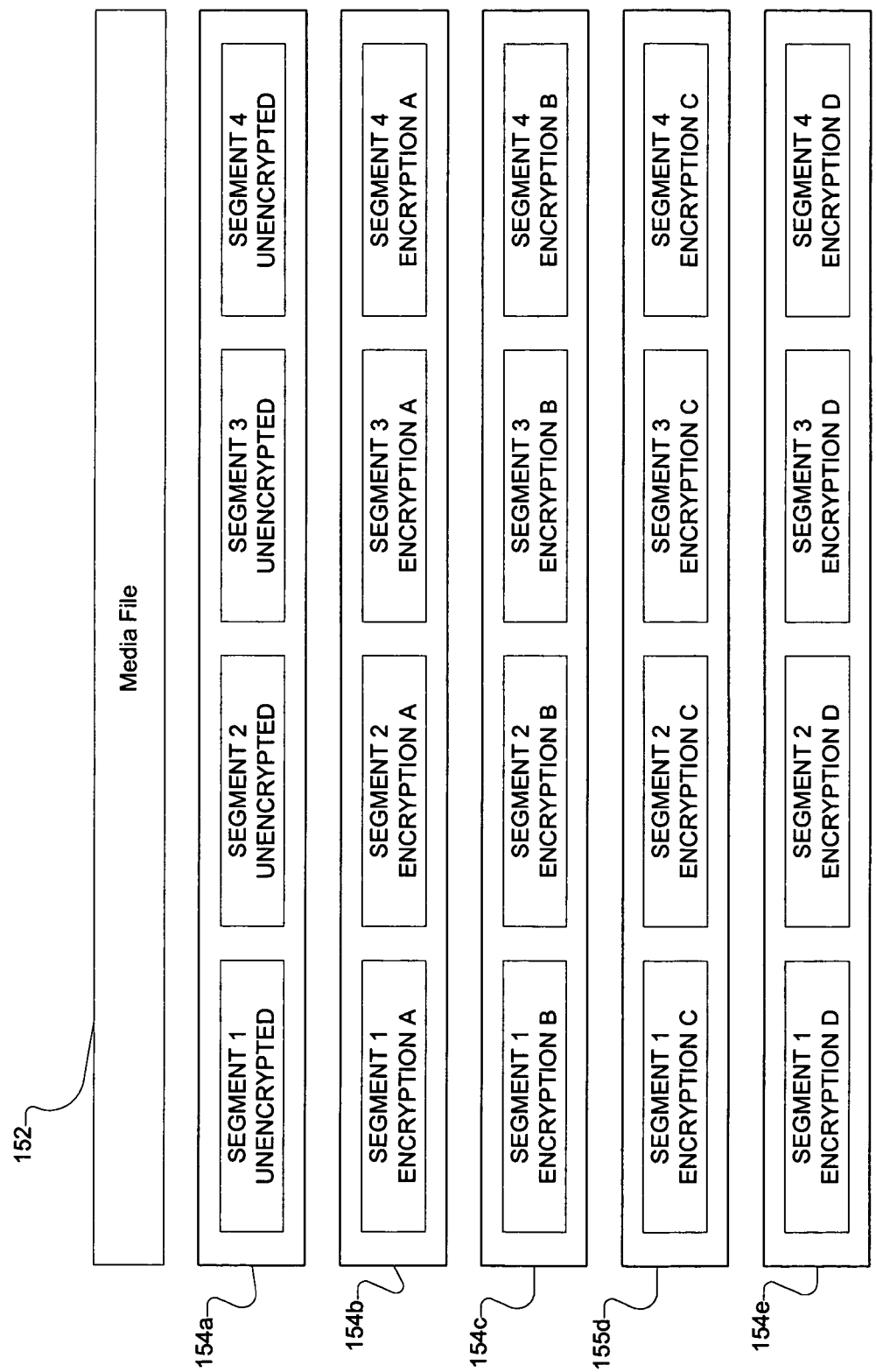
FIG. 11 shows an embodiment of a matrix of media file encrypted segments available for distribution.

Since the user media device is downloading file segments from peer devices, an opportunity exists to raise the security of the media files using encryption. Prior to distribution, a media file is segmented into a number of segments of a predetermined size as shown at 154a in FIG. 11. As these terms are used here, a media file such as 152 is a file containing some sort of media content, such as a movie. The media file is segmented and each segment encrypted, resulting in segment instances. The unique combination of encrypted segments that are used to reconstruct the media file contents at a user device is referred to as a media instance.

Each copy of a media file, such as copies 154b–154e should be segmented into segments of the same size, allowing them to be recombined at different user media devices easily. The predetermined size can be controlled to allow for ease of insertion of advertisements into the segments, such as replicating a broadcast television program. A particular segment would be played, the advertisement insert would then be played, and then the next segment of the file would be played. The media segments may be played back in different ways, such as being played back serially as separate files with the inserted ads, or recombined into one contiguous file which could bypass ad-skipping functionality.

Each segment is then copied and encrypted to several different keys, generating what will be referred to here as segment instances. An example of a matrix of media file segments and different encryptions is shown as copies 154b–154e in FIG. 11. Further, an association exists between the media file, the segment number to be decrypted by the key, and the algorithm used to encrypt it. The decryption keys for these segment instances are stored on one of the servers mentioned previously, or a dedicated encryption server. The media module would then select peer sources for a particular user device to ensure a unique or nearly unique combination of segment instances to make up one complete instance of the desired media file.

Figure 12:
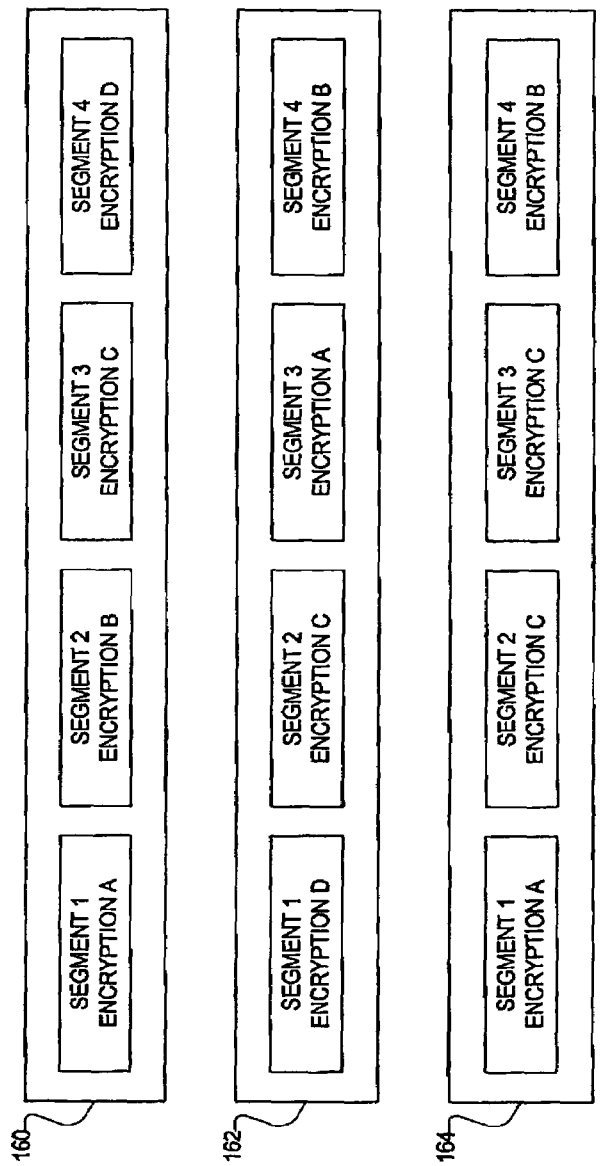
FIG. 12 shows embodiments of media instances with encrypted segments.

As shown in FIG. 12, for example, the same media file could be downloaded to two different user media devices in four segments. For purposes of discussion, assuming there are four different keys, the media file for the first user would have the format as shown in media instance 160 and the media file for the first user would have the format as shown in media file 162.

Additional unique media instances such as that in 164 may be created on subsequent user devices by performing a centrally controlled, peer-to-peer transfer of selected segment instances from media instances 160 and 162. It must be noted that the media instances of all three users are different. The media module would control the download of the media file to the first user and the second user from their respective peer devices such that neither user would receive an identical instance of the same media file.

When the time came to allow the user access to the media file, the 'key' used to decrypt the file would actually be a structured key bundle comprised of multiple keys, and containing instructions for the decryption and re-assembly of all segment instances required to create the desired user-viewable media file. Referring to FIG. 12, it first appears that a key bundle containing keys to the encryption methods A–D would allow anyone to unlock any segment that had been encrypted with a particular key. However, each key generated will be specific to a segment.

For example, the key used to unlock segment 1 with encryption A of media instance 160, will not work to unlock segment 3 with encryption A of media instance 162. This increases the security of the media file, and still allows peers to exchange segments in an encrypted format. While it is more than likely that in the course of operation, several user media devices may receive identical media instances, that being a media file made up of segments with the same encryptions, it is possible to control the download of segments and key combinations to a user device so as to make that combination as unique as possible.

The user media devices act as peer sources of media files in a manner such that the user cannot access those media file segments for which the user does not have the key nor does the user have control over any portion of the peer sharing activities beyond requesting media files from the centralized servers. If a user were to try to access the media file segments that reside on that user's media device without the key, the user would be forced to 'sniff' or detect a key bundle in transit. In order for that key bundle to be usable, the key bundle would have to match exactly the combination of segments and keys residing on the user's device. The likelihood of this key bundle being detected on the network is decreased drastically by the encryption scheme set forth above.

Figure 13:
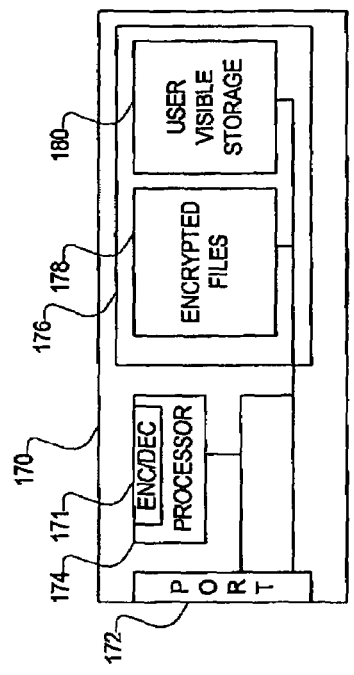
FIG. 13 shows an embodiment of a user media device.

An embodiment of a user media device is shown in FIG. 13. The user media device 170 has a port 172 that provides the interface to the network. As the segment instances are downloaded to the user's device, they are stored in the storage 176. The storage 176 is partitioned into two parts. The first partition 178 contains the encrypted files, which are shared within the network. These encrypted files may be those the user has downloaded or files that have been stored there by the network using the user media device as a peer source. This portion of the storage is not visible to the user, nor are the files accessible by the processor 174. This has a further advantage that the segment instances in the encrypted partition do not impact the available storage space from the operating system's perspective, allowing the network to freely use the space without affecting the user's experience.

The encrypted segment instances remain in the sharing cache, even after the media instances are copied to the user-visible space and decrypted. The user can only request the transfer and decryption of those files that the user has selected to download, leaving the remaining encrypted storage space available for discretionary use by the network. Once a playback license and/or a key bundle have been obtained for a media file, the appropriate segment instances are copied into the user-visible space 180. The files are then decrypted, or possibly decrypted in transit by an encryption/decryption function 171 in processor 174. The function may be in hardware or software that causes the processor to perform the function. The selection of decryption-in-transit versus decryption upon copy is dependent on the physical design of the user media device being used and is left up to the system designer.

The files in the user-visible space are only those that the user has ordered and downloaded, and for which a key bundle has been issued. Users never have the ability to selectively share files within the network. Since users cannot selectively share any files, either encrypted or decrypted, copyrights can be strictly managed, while allowing the peer network to employ users' devices as peer sources for other user devices.

In this manner, the advantages of a peer network are employed in a non-autonomous manner, allowing management of and accounting for license rights to media content. The network is scalable with the addition of a few additional modules and the easy addition of more peers, has relatively low start up costs and continued operation costs.

Thus, although there has been described to this point a particular embodiment for a method and apparatus for media on demand through a peering network, it is not intended that such specific references be considered as limitations upon the scope of this invention except in-so-far as set forth in the following claims.

What is claimed is:

1. A method of protecting media files, comprising:
dividing a media file into file segments;
encrypting each file segment with multiple different encryption keys, resulting in multiple unique file segment instances;
controlling downloads of the file segment instance such that different combinations of file segments are downloaded as a complete instance of the media file; and
providing key bundles to user devices, wherein each key bundle is a unique combination of keys only for a particular complete instance of the media file on the user devices different from at least one other bundle of keys for other media instances.

2. The method of claim 1, encrypting each segment further comprising:
encrypting each segment such that a key for the segment is not usable for a different segment encrypted with the same encryption algorithm.

3. The method of claim 1, controlling downloads further comprising:
selecting segment instances related to a media file that are stored on other peers in the network such that the resultant media instance is as unique as possible.

4. A user media device, comprising:
a port to allow the device to communicate with a network, such that the network may deliver to and transfer from the device;

a storage having an encrypted file store not visible to the user or the user media device operating system and a user-visible file store;

a processor to:

receive segment instances and store the segment instances in the encrypted file store to form a unique media instance;

transmit segment instances to peers on the network as requested by the network;

receive a unique key bundle for the segment instances comprising the selected media instance in the encrypted file store;

decrypt only those encrypted file segments for which a key is received, creating decrypted file segments; and move the decrypted file segments to the user-visible store, leaving the encrypted file segments in the encrypted file store for use by the network.

5. The user media device of claim 4, the processor further to move only decrypted files to the user-visible store.

6. The user media device of claim 4, the encrypted file store being configured so as to not be visible to the user media device operating system with regard to available drive space.

7. The user media device of claim 4, the processor to decrypt and move further to decrypt and copy simultaneously.

* * * * *